(12) United States Patent
Laber et al.

(10) Patent No.: US 7,870,098 B2
(45) Date of Patent: Jan. 11, 2011

(54) METHOD AND SYSTEM FOR MAINTAINING HISTORICAL DATA FOR DATA RECEIVERS

(75) Inventors: Werner H. Laber, Ubstadt-Weiher (DE); Klaus Akemann, Mauer (DE); Daniel J. Goldmann, Mannheim (DE); Michael Frauenkron, Wiesloch (DE)

(73) Assignee: SAP AG, Walldorf (DE)

( * ) Notice: Subject to any disclaimer, the term of this patent is extended or adjusted under 35 U.S.C. 154(b) by 814 days.

(21) Appl. No.: 10/840,618

(22) Filed: May 7, 2004

(65) Prior Publication Data
US 2005/0251521 A1 Nov. 10, 2005

(51) Int. Cl.
*G06F 7/00* (2006.01)
*G06F 17/00* (2006.01)
(52) U.S. Cl. .................. 707/625; 707/628; 707/631; 707/632; 707/638
(58) Field of Classification Search ................ 707/204, 707/625, 628, 631, 632, 638; 713/100
See application file for complete search history.

(56) References Cited
U.S. PATENT DOCUMENTS

| | | | | |
|---|---|---|---|---|
| 5,768,528 A | * | 6/1998 | Stumm | 709/231 |
| 6,308,283 B1 | * | 10/2001 | Galipeau et al. | 714/6 |
| 6,651,075 B1 | * | 11/2003 | Kusters et al. | 707/204 |
| 7,085,785 B2 | * | 8/2006 | Sawdon et al. | 707/204 |
| 2003/0051128 A1 | * | 3/2003 | Rodriguez et al. | 713/100 |

* cited by examiner

*Primary Examiner*—Khanh B Pham
*Assistant Examiner*—Ann J Chempakaseril
(74) *Attorney, Agent, or Firm*—Kenyon & Kenyon LLP

(57) ABSTRACT

Embodiments of the present invention relate to creating a new change pointer to indicate a change to be made to data on a database. For a receiver of the data, it may be determined whether the receiver requires historical data, and if so, an image of the data may be created before changing it. The historical data, in the form of an image or images, may be subsequently "pulled" (requested and received) by the receiver, or "pushed" (sent without being requested) to the receiver.

18 Claims, 6 Drawing Sheets

METHOD AND SYSTEM FOR MAINTAINING HISTORICAL DATA FOR DATA RECEIVERS

FIELD OF THE INVENTION

Embodiments of the present invention relate generally to computer-implemented systems for information management, and more particularly to a method and system for maintaining historical data for data receivers.

BACKGROUND INFORMATION

Banks and other institutions may use computerized systems to manage information. A computerized system may include one or more software components, associated interfaces, databases and supporting hardware. Components may comprise a plurality of applications. Various ones of the components may require information from, or supply information to, others of the components, where the components may belong either to a common computerized system or distinct computerized systems.

An example occurs in banks. One software component of a computerized system of a bank might be used for managing loans made by the bank—e.g., taking loan applications, administering payments and the like. Another software component of a computerized system of the bank might relate to collateral management. The collateral management component would typically need information from the loan management component, and vice versa, for example to determine whether a loan applicant had provided enough security for a given loan to be approved. Further, both the loan management component and the collateral management component might supply information, from time to time, to an analyzer component that used the information to perform calculations, generate statistics and perform regulatory reporting.

Sharing of information between computerized systems as described in the foregoing need not be confined to a single institution such as a bank. Various independent entities (e.g., businesses, government agencies) need to be able to obtain the information of other independent entities, and to provide information to other independent entities. There could be a one-way flow of information between entities, or a two-way flow. That is, an entity might supply information to another, but not receive information from the other; or might receive information from another but not supply it to the other. On the other hand, two entities might mutually exchange information.

In the various computerized systems described in the preceding, in many cases the supplying of information and the obtaining of information needs to be possible on demand in order for the businesses and other institutions served by the systems to operate properly. For example, in a bank, a loan could be initially approved, but then the requested amount of the loan might increase. In this event, the loan management component would need to determine whether the value of the collateral securing the loan was enough to secure the increased loan amount. Therefore, the loan management component would need to obtain the value of the collateral from the collateral management component. Similarly, the collateral management component would need to be informed about the increased loan amount.

Moreover, different entities need different information at different times. For example, a bank analyzer component might need historical information about loans stretching back weeks or months in order to perform its functions. On the other hand, a collateral management component might never need anything more than the most current "snapshot" of a loan status.

Computerized systems are known for handling information flow as described above. Such systems may abstract suppliers of information as "senders," and requesters or receivers of information as "receivers." In view of the differing needs of receivers, one challenge for the systems associated with on-demand service is ensuring that a given receiver gets the kind of information it needs, when it needs it. The challenge is presented largely by the fact that information is continually changing and being added to, while computer processing and data storage capabilities are finite.

By way of illustration, consider again the example of a bank. Information about a given account might change a number of times over the course of a day, week or month. For a first receiver of information about the account, only current information might be needed. On the other hand, a second receiver of information about the account might need to know the information for one or more points in the past. Still a third receiver might need to know information about the account for one or more points in the past different from the points that the second receiver is interested in.

There might be many more such changing accounts in the bank, and many more receivers with varying needs for information about the accounts. One straightforward approach to meeting the needs of all the receivers might be to simply maintain independent copies of the information as needed for each receiver. However, this approach is clearly unworkable because of the huge demands it would place on data storage and processing capacity.

Accordingly, it is known to only supply and receive changes in the information. That is, assuming an initial or base information set, only changes to the base information set, such as modifications, additions or deletions are supplied to interested receivers. In the case of a bank loan, for example, the base information set might include such data as an account number, a borrower's name and address, and initial conditions, such as an initial interest rate. Then, the base information set might be changed, for example, by a modification of the initial interest rate, the addition or deletion of participants in the loan, the occurrence of an early termination, or the like. Interested receivers, assuming they already have all or some the base information set, can keep up-to-date in accordance with their respective needs by being informed only of the changes.

Existing techniques for propagating such changes include a "push" technique and a "pull" technique. In a push technique, when a change occurs in a sender's information, the sender sends the change information, without being requested to, to all known interested receivers at substantially the same time as the change occurs, or at some later, previously arranged or convenient time. In a pull technique, a receiver requests information when it wants it, and a sender returns information in response to the request.

However, there are disadvantages associated with known techniques. One disadvantage is that a receiver that uses a pull technique (a "pull receiver") cannot obtain reliable historical data. This is because a pull receiver may not know when information that it is interested in has changed, and consequently may not request the change information. Thus, if the information changes again before the pull receiver requests the earlier change information, that earlier change information may be lost for the pull receiver. While it would be possible for a sender to push change information to all interested receivers whenever change occurs, this would not be an acceptable arrangement for most pull receivers, since most pull receivers are only able to process information at times of their choosing. Further, the arrangement would in general place excessive demands on and lower the performance of the associated computer systems. Another alternative would be for the sender to save copies of all pre-change data in the event a pull receiver later wants historical data. However, this alternative also has disadvantages, since, along lines discussed earlier, it would be costly in terms of data processing and storage capacity, and there may be cases when there is no actual need for the saved data.

SUMMARY OF THE INVENTION

Embodiments of the present invention address disadvantages in the prior art as discussed above. The embodiments relate to preserving historical data only for those receivers that require it. Thus, historical data is kept only when necessary and the excessive demands associated with alternative implementations are avoided. Moreover, the needs of pull receivers requiring historical data are efficiently met.

The embodiments relate more specifically to creating a new change pointer to indicate a change to be made to data on a database. For a receiver of the data, it may be determined whether the receiver requires historical data, and if so, an image of the data may be created before changing it. This pre-change image may be stored on an image database, and then the data may be changed on a current database. The new change pointer may be related to the changed data on the current database, and the image may be related to a previous change pointer.

A plurality of images may be created in this way over time. When a receiver, such as a pull receiver, that needs historical data requests the historical data, the images may be retrieved for the receiver and the associated pointers may be correspondingly updated to indicate that the receiver has been provided with the historical data (the images). The images may also be provided to a receiver by a push mechanism.

DETAILED DESCRIPTION

Figure 1:
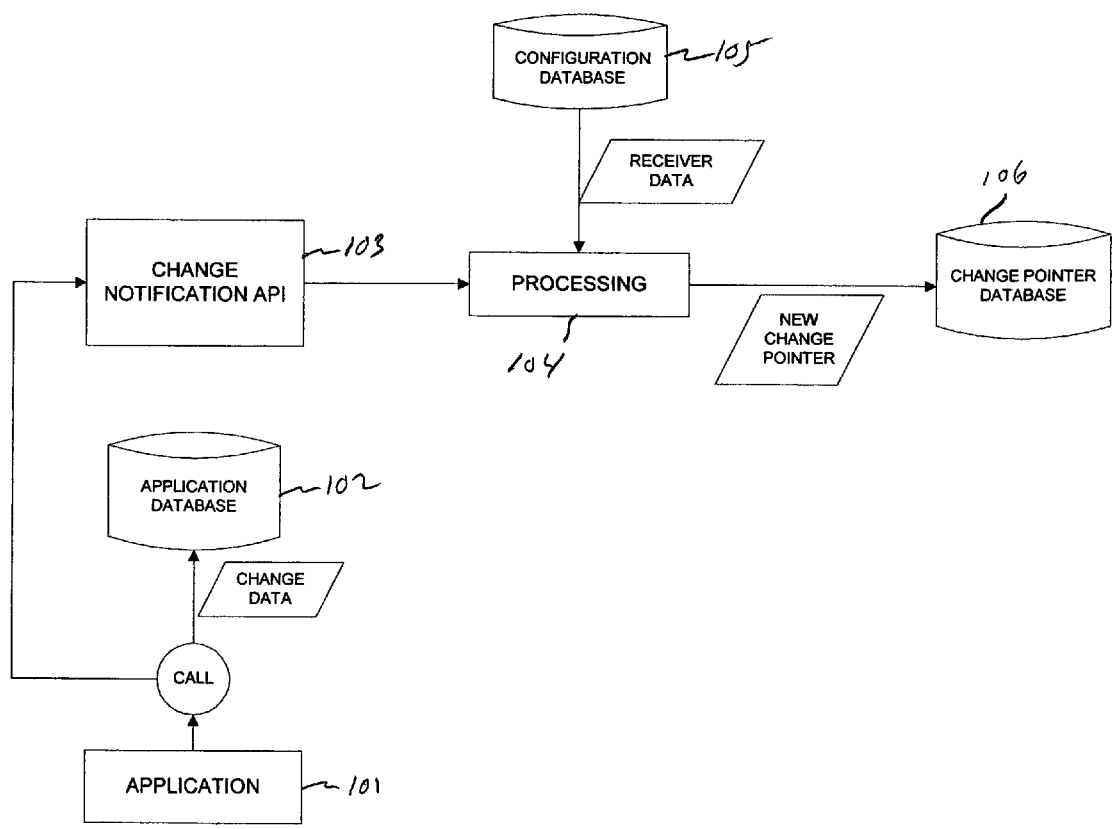
FIGS. 1 and 2 show operations to change data according to embodiments of the present invention.

FIG. 1 shows operations to change data according to embodiments of the present invention. In FIG. 1, an application 101 executes program instructions to change (modify, delete or add) data stored electronically on a machine-readable medium such as disk, the medium embodying an application database 102. The application 101 could be an application of a software component of a computerized system. The data could relate, for example, to an "object," where an object is a representation of something in data and/or programming terms. For example, a loan object stored on database 102 could represent a particular loan made by a bank. The object could have associated therewith a base information set along lines discussed above. The base information set might include such data as an account number, a borrower's name and address, and initial conditions, such as an initial interest rate. The application 101 could be, for example, an application of a computerized loan management system of a bank, that is being executed to modify/delete/add something in/from/to the base information set of the loan object.

Before changing the data, the application 101 may call a change notification API (Application Program Interface) 103, and pass it parameters relating to the change. For example, the parameters could include an object type, object key, and other information. In response to the call by the application 101 and based on the parameters, the change notification API 103 may perform operations represented by block 104, labeled "processing," to add a new change pointer corresponding to the change to a change pointer database 106 embodied on a machine-readable medium. The new change pointer may include such information as what object is being changed, the time that it is being changed, and a reason or reasons for the change. The new change pointer may further include such information as a unique change pointer identifier, a change origination, and a time stamp.

As part of the processing 104, the change notification API 103 may consult a configuration database 105 embodied on a machine-readable medium to determine whether there are any receivers that need historical data for the object whose associated data is being changed. Assume in this example that there is at least one such receiver. The processing 104 may then further include checking for whether any other change pointers have been created earlier for the same object that have not yet been processed for the at least one receiver. If there were an unprocessed change pointer, this would be an indication that the receiver had not yet received the associated change information. In the present example, assume that no earlier change pointer exists for the object whose associated data is being changed. The application 101 may then proceed to change data associated with the object on the application database 102.

Figure 2:
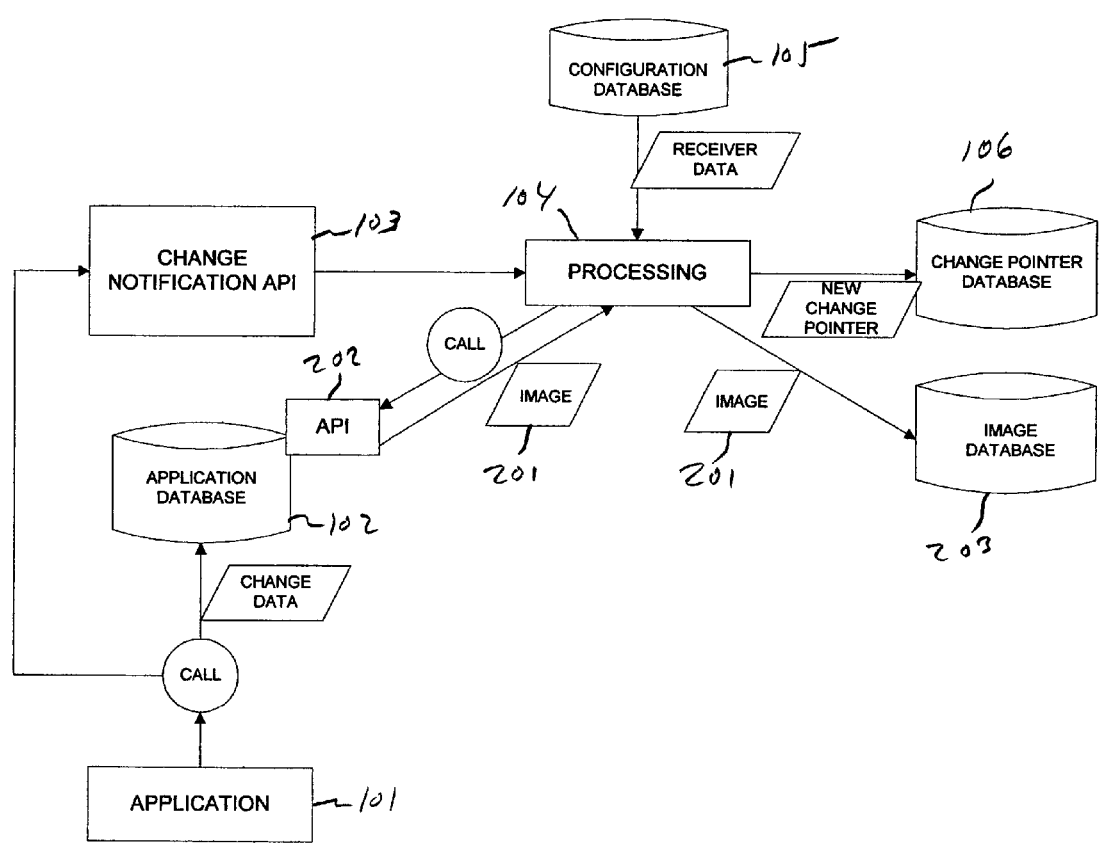

FIG. 2 shows further operations according to embodiments of the present invention. Again, an application 101 is changing data on an application database 102. Assume for purposes of illustration that data associated with the same object as discussed in connection with FIG. 1 is being changed. Before changing the data associated with the object, the application 101 may call the change notification API 103, passing it such parameters as the object type and object key. In response to the call and based on the parameters, the change notification API 103 may perform processing 104 to add a new change pointer corresponding to the change to the change pointer database 106.

As discussed earlier in connection with FIG. 1, as part of the processing 104, the change notification API 103 may consult the configuration database 105 to determine whether there are any receivers that need historical data for the object whose associated data is being changed. Recalling that there is at least one such receiver in the present example, the change notification API 103 may consult the change pointer database 106 to determine whether there are any pointers associated with the object that have not yet been processed for the receiver. Assume that the change pointer created as discussed in connection with FIG. 1 has not yet been processed for the receiver. If there is any such unprocessed change pointer, this signifies that there exists change data that the receiver has not yet received. In embodiments, the change data might be represented by a new version of the object.

According to embodiments of the present invention, based at least in part on the condition that there is an unprocessed change pointer for the interested receiver, an image 201 may be made. An image is a copy of the current data before it is changed.

To create the image 201, the processing 104 may call back to the application 101 via another API 202. In response to the call back, the application 101 may read the pre-change data from the application database 102 and pass it as an image 201 via the API 202 to the processing 104. The processing 104 may store the image 201 on an image database 203 embodied in a machine-readable medium. The processing 104 may further relate the image 201 to the previously-created pointer (the pointer created as described with reference to FIG. 1), and create a new change pointer for the current change. The application 101 may then proceed to change the data on the application database 102.

A plurality of images may be created in the foregoing way over time, for any receiver that needs historical data for data being changed. More specifically, there may be only one image created for all receivers that need the image, but a number of new images may be created as additional changes occur. It may be understood in view of the above that historical data is preserved for receivers that need it in an efficient manner, since pre-change data is only copied when necessary (i.e., only when an interested receiver that needs historical data has not yet received it), thereby conserving data processing and storage capacity. Moreover, the needs of pull receivers are efficiently met.

The information as to what receivers need historical data (images) may be kept, as noted earlier, in a configuration database 105. The configuration database 105, more specifically, could be "customizing" data that is specific to particular user(s) and/or application(s). The customizing data could include a definition, per "export object" (object subject to being pushed or pulled) of: whether images of the object are available at all (some objects may not support images); which receivers are interested the object (subscription); whether a subscribing receiver requires historical data for the object; and other parameters.

When a receiver subsequently pulls (requests and receives) change data, and consequently, a corresponding image or images, the associated change pointer(s) may be correspondingly updated to indicate that the pointer(s) has/have been processed for a particular receiver. Thus, if a check is subsequently performed for whether a receiver that needs historical data has already received the corresponding image or images, it can be determined from the processed change pointers.

Figure 3:
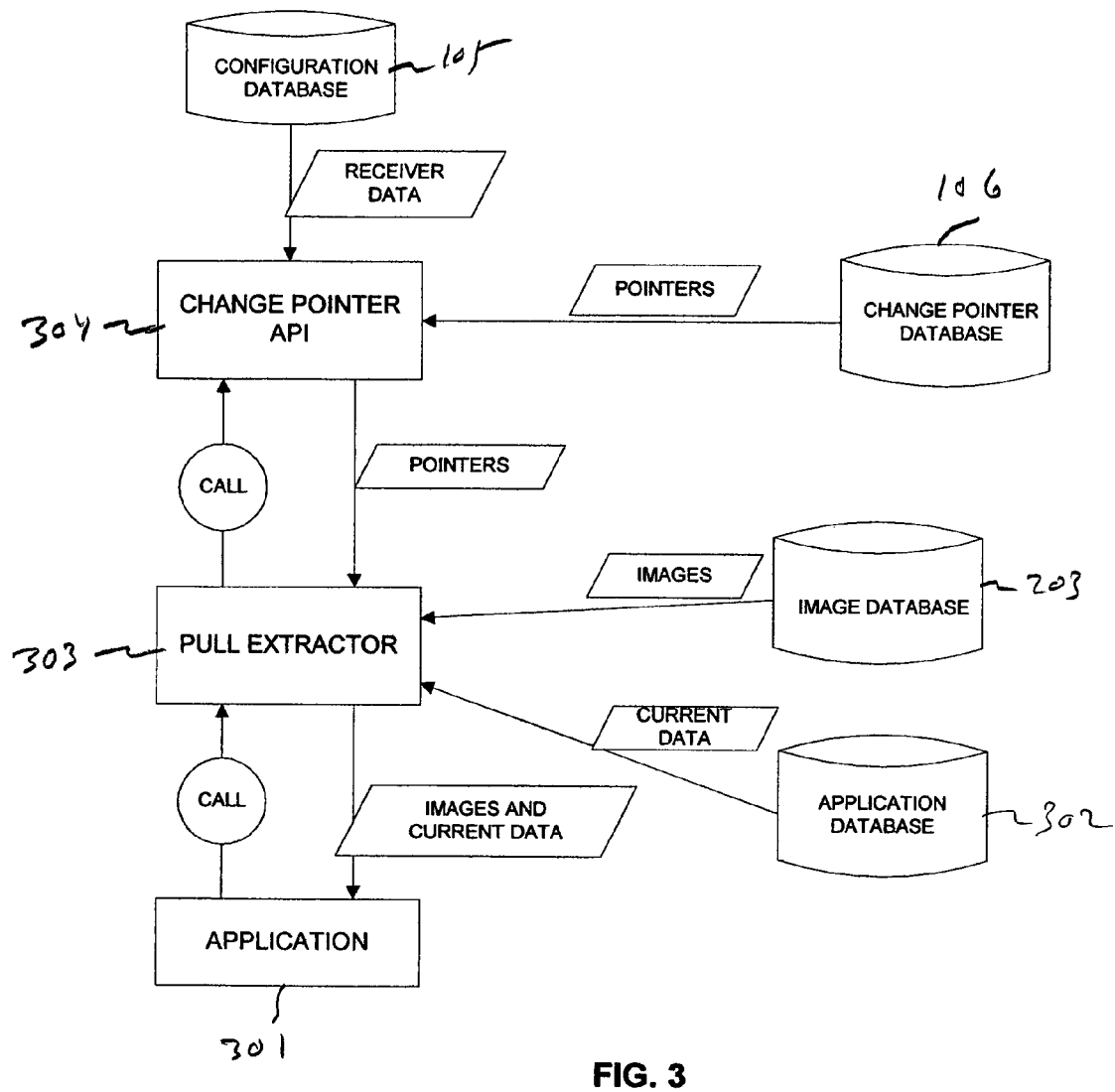
FIG. 3 shows operations to pull data according to embodiments of the present invention.

FIG. 3 shows operations performed according to embodiments of the present invention when a receiver pulls data. To pull data, an application 301 (the receiver) of a receiving component may call a pull extractor tool 303. The pull extractor tool 303 may call a change pointer API 304. The change pointer API 304 may read the change pointer database 106 to determine whether any data of interest to the receiver has changed since the last time change data was pulled for the receiver. This determination could be made, for example, for each object of interest to the receiver having a change pointer, based on the time stamp associated with the object's pointer. The change pointer API 304 may further read the configuration database 105 to determine whether the pulling receiver requires images. In view of the discussion of the creation of change pointers in connection with FIG. 1, it may be understood that if there is only one new pointer, this is an indication that there are no images associated with the data to be pulled. In other words, if there is any new change data to be pulled, it is current data on the application database. On the other hand, if there is more than one pointer associated with the data to be pulled, this is an indication that there are images (historical data) associated with the change data to be pulled.

Any new pointer created since the last pull may be returned by the change pointer API 304 to the pull extractor tool 303. If the pulling receiver 301 requires images, for each pointer associated with an image, the corresponding image may be retrieved from the image database 203 by the pull extractor tool 303 and returned to the pulling receiver 301. Additionally, the current data on the application database 302 may be retrieved and returned to the pulling receiver 301. After any images and/or current data are retrieved for the pulling receiver, the change pointer database 106 may be updated to indicate that the associated pointers have been processed for that particular pull receiver. Thus, if the change notification API 103 subsequently consults the change pointer database 105 to determine whether there are any pointers associated with change data that have not yet been processed for the receiver, the pointers will correctly indicate that the receiver has received the needed change data.

Figure 4:
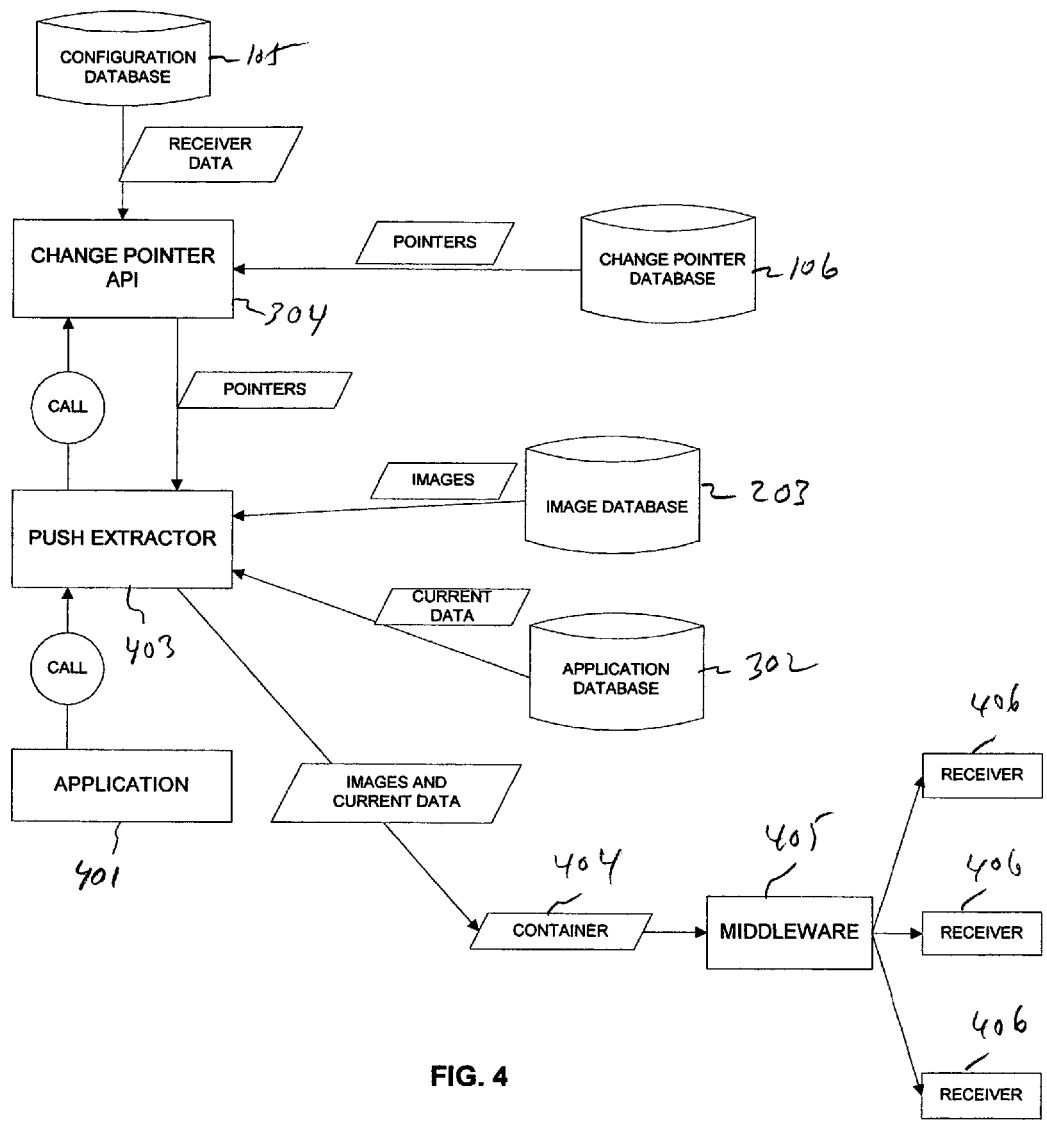
FIG. 4 shows operations to push data according to embodiments of the present invention.

FIG. 4 shows operations performed according to embodiments of the present invention when a sender pushes data. In FIG. 4, an application 401 (the sender) of a sending component decides that it needs to send data to interested receivers 406. The application 401 might send data at some pre-arranged intervals, for example, or when it is not busy with other work.

To send data, the application 401 may call a push extractor tool 403. The push extractor tool 403 may call the change pointer API 304. The change pointer API 304 may read the change pointer database 106 and determine whether in fact there is any data that needs to be sent, based, for example, on whether any new change pointers were created for the data to be sent since the last push. The change pointer API 304 may return any new pointers to the push extractor tool 403. The change pointer API 304 may further read the configuration database 105 to determine whether any receiver requires images. If there is only one pointer, this is an indication that there are no images associated with the data to be sent. In other words, if there is any data to be sent, it is current data on the application database 302. On the other hand, if there is more than one pointer associated with the data to be sent, this is an indication that there are images associated with the data to be sent.

If a receiver 406 requires images, for each pointer associated with an image, the corresponding image may be retrieved from the image database 203. Additionally, the current data on the application database 302 may be retrieved. According to embodiments, the push extractor tool 403 may store retrieved images in a "container," (404) which is a grouping of data items where the grouping has a predetermined size limit to facilitate subsequent handling. If current data is retrieved from the application database 302, it may be converted into image format before being placed in the container. If and when the container reaches its size limit, or there is no more data to put in the container, the container may be sent to a "middleware" layer of software 405 that distributes the data in the container to various interested receivers 406. A plurality of containers 404 may be filled and sent for distribution in a loopwise manner, until all required data is pushed. After any images and/or current data are pushed to a receiver 406, the change pointer database 106 may be updated to indicate that the associated pointers have been processed for that particular receiver. Although not shown in FIG. 3, such containers could also be used for pull receivers.

Figure 5:
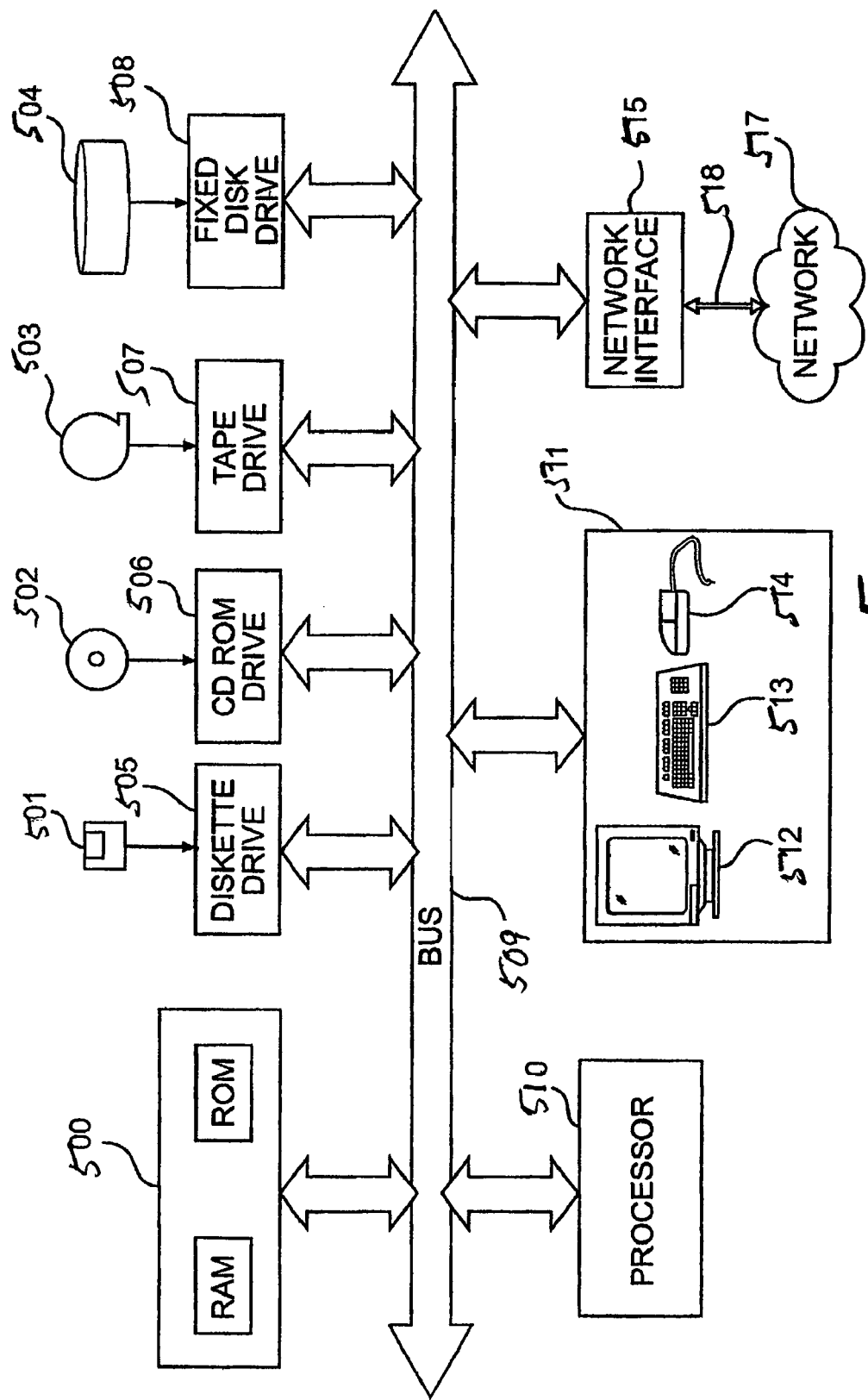
FIG. 5 shows a system for implementing embodiments of the present invention.

FIG. 5 shows a high-level representation of a computer system for implementing embodiments of the present invention, such as might be realized by a variety of known and commercially available hardware and software elements. The system may comprise a memory 500 including ROM and RAM, processor 510 and user interface 511 comprising a display device 512, keyboard 513 and mouse 514. Elements may communicate via a system bus 509. The system may further comprise a network 517 connected by a network medium 518 and network interface 515.

A computer program or collection of programs comprising computer-executable instructions according to embodiments of the present invention may be stored and transported on machine-readable media such as diskette 501, CD-ROM 502, magnetic tape 503 and fixed disk 504. The computer instructions may be retrieved from the machine-readable media 501-504 using their respective reading devices 505-508 into memory 500, and executed by a processor 510. The functionality disclosed hereinabove for performing the embodiments may find specific implementations in a variety of forms, which are considered to be within the abilities of a programmer of ordinary skill in the art after having reviewed the specification.

Figure 6:
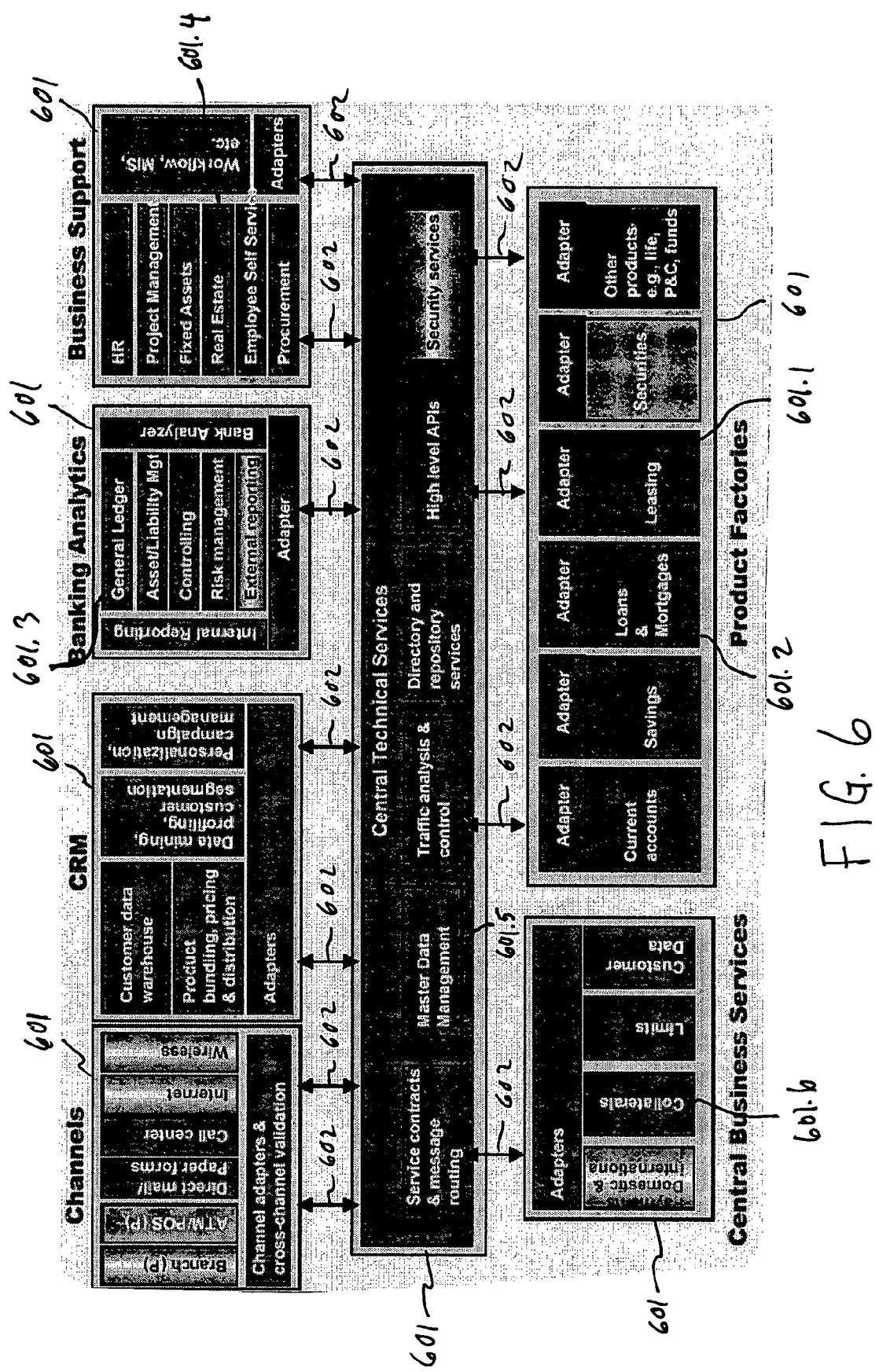
FIG. 6 shows an example of a data processing infrastructure including client-server systems wherein software according to embodiments of the present invention might find useful application.

FIG. 6 shows an example of a data processing infrastructure wherein software according to embodiments of the present invention might find useful implementation. The infrastructure comprises software and associated hardware platforms. The software comprises components such as a leasing component 601.1, a loans & mortgage component 601.2, a general ledger component 601.3, a real estate component 601.4, a master data management component 601.5, and a collaterals component 601.6. Related components may be logically grouped into groups 601. Each of the components 601.*n* may run in its own client-server environment and execute applications that use adapters for push and pull operations as described above to perform data exchanges 602 between components.

More specifically, the components could execute on a plurality of hardware platforms in a client-server environment. The environment may include client machines to handle front-end processing (e.g., user interfaces), application servers to process application logic, and database servers to handle the database access.

It may be appreciated in view of the foregoing description that embodiments of the invention efficiently address disadvantages in the prior art by reducing a number of images to a minimum based on a receiver's requirements. Moreover, the embodiments provide an extraction process (the push and pull extractors described above) that minimizes the number of objects replicated, and supports both push and pull scenarios using a common framework.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A computer-implemented method of managing a source database having data to be transmitted to receivers, comprising:

executing, by the computer, an application program to generate a modification to data that already is stored in the source database and that represents a change to an object;

before updating the source database with the modification, executing, by the computer, a change notification API program to create a change pointer indicating the modification to be made to the source database;

executing, by the computer, a processing process to:
identify, based on data stored in a configuration database, at least one of the receivers that request from the source database the data representing the object;
determine whether there is another previously-created change pointer of the object having an indicator to indicate that a modification corresponding to the previously-created change pointer has not been received by the at least one of the receivers;
if there is no such previously-created change pointer, update the source database with the modification, and store the change pointer in a centralized change pointer database;
if there is one such previously-created change pointer, retrieve the data that is already stored in the source database;
store the retrieved data as an image in an image database, the image being identified as related to at least one of the receivers identified in the identifying step;
update the previously-created change pointer that relates to the image; and
store the change pointer in the centralized change pointer database; and
thereafter, updating the source database with the modification.

2. The method of claim 1, further comprising:
relating the change pointer to the modified data; and
relating the image to the previously-created change pointer.

3. The method of claim 1, further comprising:
retrieving the image for the at least one of the receivers in response to a request; and
processing the previously-created change pointer related to the image to indicate that the at least one of the receivers has received the image.

4. The method of claim 1, further comprising:
in response to a request from a receiver for retrieving data that represents an object and is contained in the source database, reading the centralized change pointer database to identify how many change pointer data elements stored within the centralized change pointer database are associated with the requested data;
if only one change pointer data element is identified, retrieving the data that is stored in the source database to the receiver; and
if more than one change pointer data elements are identified, retrieving, to the receiver, the data that is stored in the source database and historical data from the image database corresponding to each change pointer data element.

5. The method of claim 4, further comprising processing a new change pointer to indicate that the receiver has received the corresponding historical data from the image database.

6. The method of claim 1, further comprising:
initiating a sending of data from the source database to a receiver;
reading a centralized change pointer database to determine how many new change pointer data elements associated with the data have been created since a previous sending of the data;
if only one new change pointer data element has been created, sending the data that is stored in the source database to the receiver;

if more than one new change pointer data elements have been created, for each new change pointer data element associated with historical data,
retrieving, from an image database, a historical data corresponding to the each new change pointer data element, and
storing the historical data corresponding to the each new change pointer data element in a container; and
sending the current data from the database and all data in the container to the receiver.

7. The method of claim 6, further comprising processing the new change pointer to indicate that the receiver has received the corresponding historical data.

8. A data preservation system comprising:
a processor;
a storage stored thereon a source database;
receivers coupled to the source database to receive data therefrom;
a memory coupled to processor and storing instructions executable by the processor to perform a process comprising:
generating a modification to data that already is stored in the source database and that represents a change to an object;
before updating the source database with the modification,
creating a change pointer indicating the modification to be made to the source database;
identifying, based on data stored in a configuration database, at least one of the receivers that request from the source database the data representing the object;
determining whether there is another previously-created change pointer of the object having an indicator to indicate that a modification corresponding to the previously-created change pointer has not been received by the at least one of the receivers;
if there is no such previously-created change pointer,
updating the source database with the modification, and
storing the change pointer in a centralized change pointer database;
if there is one such previously-created change pointer,
retrieving the data that is already stored in the source database;
storing the retrieved data as an image in an image database, the image being identified as related to at least one of the receivers identified in the identifying step;
updating the previously-created change pointer that relates to the image; and
storing the change pointer in the centralized change pointer database; and
thereafter, updating the source database with the modification.

9. The system of claim 8, the process further comprising:
relating the change pointer to the modified data; and
relating the image to the previously-created change pointer.

10. The system of claim 8, the process further comprising:
retrieving the image for the at least one of the receivers; and
processing the previously-created change pointer related to the image to indicate that the at least one of the receivers has received the image.

11. A machine-readable medium stored thereon computer-executable instructions, the instructions when executed performing a process of managing a source database having data to be transmitted to receivers, the process comprising:
executing, by the computer, an application program to generate a modification to data that already is stored in the source database and that represents a change to an object;
before updating the source database with the modification,
executing, by the computer, a change notification API program to create a change pointer indicating the modification to be made to the source database;
executing, by the computer, a processing process to:
identify, based on data stored in a configuration database, at least one of the receivers that request from the source database the data representing the object;
determine whether there is another previously-created change pointer of the object having an indicator to indicate that a modification corresponding to the previously-created change pointer has not been received by the at least one of the receivers;
if there is no such previously-created change pointer,
update the source database with the modification, and
store the change pointer in a centralized change pointer database;
if there is one such previously-created change pointer,
retrieve the data that is already stored in the source database;
store the retrieved data as an image in an image database, the image being identified as related to at least one of the receivers identified in the identifying step;
update the previously-created change pointer that relates to the image; and
store the change pointer in the centralized change pointer database; and
thereafter, updating the source database with the modification.

12. The machine-readable medium of claim 11, the process further comprising:
relating the change pointer to the modified data; and
relating the image to the previously-created change pointer.

13. The machine-readable medium of claim 11, the process further comprising:
retrieving the image for the at least one of the receivers; and
processing the previously-created change pointer to indicate that the at least one of the receivers has received the image.

14. The machine-readable medium of claim 11, the process further comprising:
in response to a request from a receiver for retrieving data that represents an object and is contained in the source database, reading the centralized change pointer database to identify how many change pointer data elements stored within the centralized change pointer database are associated with the requested data;
if only one change pointer data element is identified, retrieving the data that is stored in the source database to the receiver; and
if more than one change pointer data elements are identified, retrieving, to the receiver, the data that is stored in the source database and historical data from image corresponding to each change pointer data element.

15. The machine-readable medium of claim 14, the process further comprising: processing a new change pointer to indicate that the receiver has received the corresponding historical data from the image database.

16. The machine-readable medium of claim 11, the process further comprising:
- initiating a sending of data from the source database to a receiver;
- reading a centralized change pointer database to determine how many new change pointer data elements associated with the data have been created since a previous sending of the data;
  - if only one new change pointer data element has been created, sending the data that is stored in the source database to the receiver;
  - if more than one new change pointer data elements have been created, for each new change pointer data element associated with historical data,
    - retrieving, from an image database, a historical data corresponding to the each new change pointer data element, and
    - storing the historical data corresponding to the each new change pointer data element in a container; and
  - sending the current data from the database and all data in the container to the receiver.

17. The machine-readable medium of claim 16, further comprising processing the new change pointer to indicate that the receiver has received the corresponding historical data.

18. The method of claim 1, wherein the change pointer includes a time stamp.

* * * * *